(12) United States Patent
Boorom et al.

(10) Patent No.: US 7,744,980 B2
(45) Date of Patent: Jun. 29, 2010

(54) LOW CTE CORDIERITE HONEYCOMB ARTICLE AND METHOD OF MANUFACTURING SAME

(75) Inventors: James Albert Boorom, Coopers Plains, NY (US); Lin He, Horseheads, NY (US); Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 927 days.

(21) Appl. No.: 11/314,431

(22) Filed: Dec. 20, 2005

(65) Prior Publication Data

US 2007/0141301 A1 Jun. 21, 2007

(51) Int. Cl.
- *B32B 3/12* (2006.01)
- *B01D 39/06* (2006.01)
- *B28B 3/20* (2006.01)
- *C04B 35/64* (2006.01)

(52) U.S. Cl. .................. 428/116; 428/64.5; 428/304.4; 428/593; 52/523; 264/631

(58) Field of Classification Search ....................... None
See application file for complete search history.

(56) References Cited

U.S. PATENT DOCUMENTS

| | | | |
|---|---|---|---|
| 2,684,919 A | 7/1954 | Berry et al. ................ 117/76 |
| 3,885,977 A | 5/1975 | Lachman et al. ............. 106/62 |
| 4,434,117 A | 2/1984 | Inoguchi et al. ............. 264/56 |
| 4,772,580 A | 9/1988 | Hamanaka et al. | |
| 4,834,646 A | 5/1989 | Terashima .................... 432/4 |
| 4,849,275 A | 7/1989 | Hamaguchi et al. ......... 428/116 |
| 4,869,944 A | 9/1989 | Harada et al. ............... 428/116 |
| 4,940,408 A | 7/1990 | Ogura et al. ................ 432/137 |
| 5,114,643 A * | 5/1992 | Beall et al. .................. 264/631 |
| 5,114,644 A | 5/1992 | Beall et al. .................. 264/63 |
| 5,262,102 A | 11/1993 | Wada ......................... 264/66 |
| 5,409,870 A | 4/1995 | Locker et al. ............... 501/119 |
| 5,938,992 A | 8/1999 | Hamanaka et al. .......... 264/43 |
| 5,997,984 A | 12/1999 | Koike et al. ................ 428/116 |
| 6,004,502 A | 12/1999 | Ito et al. ..................... 264/631 |
| 6,077,796 A | 6/2000 | Beall et al. .................. 501/9 |
| 6,087,281 A | 7/2000 | Merkel ....................... 501/9 |
| 6,214,437 B1 | 4/2001 | Beall et al. .................. 428/116 |
| 6,284,188 B1 | 9/2001 | Andou et al. ................ 264/631 |
| 6,291,379 B1 | 9/2001 | Noguchi et al. ............. 501/118 |
| 6,319,870 B1 * | 11/2001 | Beall et al. .................. 501/119 |
| 6,391,813 B1 * | 5/2002 | Merkel ....................... 501/119 |
| 6,432,856 B1 | 8/2002 | Beall et al. .................. 501/118 |
| 6,506,336 B1 | 1/2003 | Beall et al. .................. 264/630 |
| 6,562,284 B2 | 5/2003 | Beall et al. .................. 264/631 |

(Continued)

*Primary Examiner*—David R Sample
*Assistant Examiner*—Nicole T Gugliotta
(74) *Attorney, Agent, or Firm*—Joseph M. Homa

(57) ABSTRACT

Disclosed is a honeycomb ceramic article that exhibits a primary crystalline phase of cordierite having a coefficient of thermal expansion (CTE), wherein CTE<$1.5 \times 10^{-7}$/° C. over the temperature range of about 25° C. to about 800° C.; a total porosity, P, of at least 28%, a transverse I-ratio, $I_T$, of less than 0.92; and a pore size distribution wherein at least 60% of the total pore volume is comprised of pores having diameters between 0.5 μm and 5.0 μm. Also provided is a ceramic honeycomb article comprising a phase of cordierite and exhibiting a mean CTE <$1.0 \times 10^{-7}$/° C. (from 25 to 800° C.) in at least one direction, and 28%≦P≦33%. Methods of manufacturing ceramic articles comprising the aforementioned cordierite compositions are also disclosed.

41 Claims, 1 Drawing Sheet

U.S. PATENT DOCUMENTS

| | | | |
|---|---|---|---|
| 6,773,481 B2 | 8/2004 | Noguchi et al. | 55/523 |
| 6,773,657 B2 | 8/2004 | Beall et al. | 264/628 |
| 6,783,724 B2 | 8/2004 | Noguchi et al. | 264/631 |
| 6,800,108 B2 | 10/2004 | Noda | 55/523 |
| 6,814,774 B2 | 11/2004 | Ishihara et al. | 55/523 |
| 7,300,898 B2 * | 11/2007 | Wusirika | 501/119 |
| 2002/0010073 A1 * | 1/2002 | Beall et al. | 501/128 |
| 2003/0012923 A1 * | 1/2003 | Beall et al. | 428/131 |
| 2003/0165661 A1 | 9/2003 | Noguchi et al. | 428/116 |

* cited by examiner

LOW CTE CORDIERITE HONEYCOMB ARTICLE AND METHOD OF MANUFACTURING SAME

BACKGROUND OF THE INVENTION

1. Field of the Invention

The present invention is directed to a cordierite ceramic honeycomb article for use as a catalyst carrier, and methods of manufacturing same. More particularly, the invention is directed to a cordierite honeycomb article having good washcoatability as a virtue of a relatively high porosity, and good thermal shock resistance by virtue of a relatively low coefficient of thermal expansion (CTE).

2. Technical Background

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of pollutants from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to cordierite ceramics' high thermal shock resistance. The thermal shock resistance is inversely proportional to the coefficient of thermal expansion. That is, honeycombs with a low thermal expansion have a good thermal shock resistance and can survive the wide temperature fluctuations that are encountered in the application. It is generally known that the coefficient of thermal expansion of cordierite bodies is about $18 \times 10^{-7}/°$ C. in the range of 25° C.-800° C. for those polycrystalline cordierite bodies in which the cordierite crystals are randomly oriented.

The production of cordierite ($2MgO.2Al_2O_3.5SiO_2$) ceramics from mineral batches containing sources of magnesium, aluminum and silicon such as clay and talc is well known. Such a process is described in U.S. Pat. No. 2,684,919. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one direction. Furthermore, this reference describes the principle of orienting the cordierite crystals with their crystallographic c-axis in the plane of the honeycomb webs, resulting in thermal expansion values as low as $5.5 \times 10^{-7}/°$ C.

Manufacturers work continuously to optimize the characteristics of cordierite honeycomb substrates to enhance their utility as catalyst carriers. Specifically, manufacturers continually strive to optimize the thermal shock resistance and strength of such cordierite honeycomb substrates. The following patents each relate to the manufacture of ceramic honeycombs exhibiting improved thermal shock resistance or coefficient of thermal expansion (CTE).

U.S. Pat. No. 4,434,117 (Inoguchi et al.) discloses the use of a raw material mixture comprising plate-shaped talc particles and non-plate shaped particles of other ceramic materials and thereafter anisostatically forming the mixed batch so as to impart a planar orientation to the plate-shaped talc particles and then drying and firing to obtain a formed ceramic body. The ceramic bodies formed in the Inoguchi reference exhibited thermal expansion coefficients as low as $7.0 \times 10^{-7}/°$ C.

U.S. Pat. No. 5,114,643 (Beall et al.) and U.S. Pat. No. 5,114,644 (Beall et al.) disclose methods of fabricating cordierite bodies involving selecting specific raw materials that will form the desired cordierite body. Specifically, these raw material selections should not include any clay or talc, should include a MgO-yielding component, and an $Al_2O_3$-yielding component having a particle size of no greater than 15 µm and 8 µm, respectively. The raw materials are mixed together, subsequently dried and fired for a time and a temperature sufficient to form the aforementioned cordierite body. The ceramic bodies formed by these Beall references exhibited thermal expansion coefficients of less than about $9 \times 10^{-7}/°$ C. from about 25 to about 1000° C.

While such ceramics represent an improvement in the thermal expansion coefficient properties over extruded cordierite ceramics produced using pre-existing processes, still further improvements in the coefficient of thermal expansion (CTE), particularly without measurable reduction in the ceramics' strength would be desirable. Strength has become an increasingly important consideration in the design of cordierite honeycomb substrates as a result of the move to producing thinner-walled, higher cell density, increased catalytic conversion efficiency and lower back pressure cordierite honeycomb catalyst carriers.

In addition to obtaining a low CTE, achieving good washcoatability for catalyst performance, as a virtue of relatively high total porosity and preferably desirable pore distribution, is also becoming an increasingly important consideration in the production of cordierite honeycomb substrates. To that end, further improvements in obtaining relatively high porosity cordierite substrates with desirable pore distribution while maintaining sufficient substrate strengths are also desirable.

It is therefore a principal objective of the present invention to provide an improved cordierite ceramic honeycomb article, and methods for manufacturing them, that exhibit adequate strength in combination with relatively high porosity, low thermal expansion, and preferably desirable pore distribution.

SUMMARY OF THE INVENTION

The present invention provides a sintered ceramic honeycomb article and methods for manufacturing the ceramic honeycomb, having a primary crystalline phase comprising cordierite and exhibiting combinations of relatively high porosity (P), relatively low coefficient of thermal expansion (CTE)), and preferably a desirable pore size distribution (PSD).

According to a first aspect, the present invention provides a ceramic honeycomb article, comprising a phase of cordierite, wherein the sintered ceramic exhibits a mean coefficient of thermal expansion (CTE), in at least one direction, of less than $1.5 \times 10^{-7}/°$ C. across the temperature range of from 25° C. to 800° C.; a total porosity (P) of greater than or equal to 28%; a transverse I-ratio, $I_T$, of less than 0.92; and a pore size distribution wherein greater than or equal to 60% of the total pore volume has a pore diameter between 0.5 µm and 5.0 µm. Additionally, embodiments of the article may include a mean pore diameter, $d_{50}$, in the range from 2.0 µm to 4.0 µm. Further embodiments exhibit a transverse I-ratio, $I_T$, of less than 0.90; or even less than 0.87. Other exemplary embodiments exhibit CTE in at least one direction, of less than or equal to $1.0 \times 10^{-7}/°$ C. across the temperature range of from 25° C. to 800° C.; less than or equal to $0.8 \times 10^{-7}/°$ C.; or even of less than or equal to $0.5 \times 10^{-7}/°C$. Exemplary embodiments of the invention may exhibit a total porosity (P) of greater than or equal to 30%, less than or equal to 40%, or even less than or equal to 33%. A large number of embodiments exhibit total porosity of greater than or equal to 30 and less than or equal to 36%.

In another aspect of the present invention, a ceramic honeycomb article is provided comprising a phase of cordierite and exhibiting a mean coefficient of thermal expansion from 25 to 800° C. of less than $1.0 \times 10^{-7}/°C$. in at least one direction, and a total porosity of greater than or equal to 28% and less than or equal to 33%. Exemplary embodiments of this article may include a mean pore diameter, $d_{50}$, in the range from 2.0 μm to 6.0 μm. Further embodiments of the invention may exhibit a transverse I-ratio, $I_T$, of ≦0.90. Moreover, exceedingly low CTEs may be achieved by embodiments of the invention. For example, CTE may be $≦0.9 \times 10^{-7}/°C$. across the temperature range from 25° C. to 800° C.; or even $≦0.3 \times 10^{-7}/°C$. across the temperature range from 25° C. to 800° C.; and in some embodiments $≦-0.1 \times 10^{-7}/°C$. or even $≦-0.4 \times 10^{-7}/°C$. across the temperature range from 25° C. to 800° C. Exemplary embodiments exhibit P≧30%, or a modulus of rupture strength, MOR, wherein MOR>300 psi for a 600/4 cell geometry. Many embodiments exhibit the desirable combination of $CTE≦0.5 \times 10^{-7}/°C$.; and P≧30%.

According to yet another aspect of the invention, a method for manufacturing a ceramic honeycomb article including a sintered phase cordierite composition is provided. The method includes the steps of providing a plasticized cordierite precursor batch composition comprising at least one talc source having a mean particle size of at least 8 μm and a Morphology Index of at least 0.30 and not more than 0.85; one or more alumina-forming sources, optionally comprising at least one dispersible alumina-forming source having a dispersed median particle size of not more than 0.5 μm, wherein the alumina-forming sources have a weighted average median particle size that does not exceed 5 μm; at least 20 weight percent of an alumino-silicate source comprising at least one raw kaolin and, optionally, at least one calcined kaolin, wherein the weighted average median particle size of the kaolin+calcined kaolin mixture does not exceed 6 μm; and a binder system. An extruded green body is formed from the plasticized cordierite precursor batch composition; and the green body is then fired under conditions effective to convert the green body into a ceramic article comprising a sintered phase cordierite composition as described herein.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION OF THE INVENTION

Figure 1:
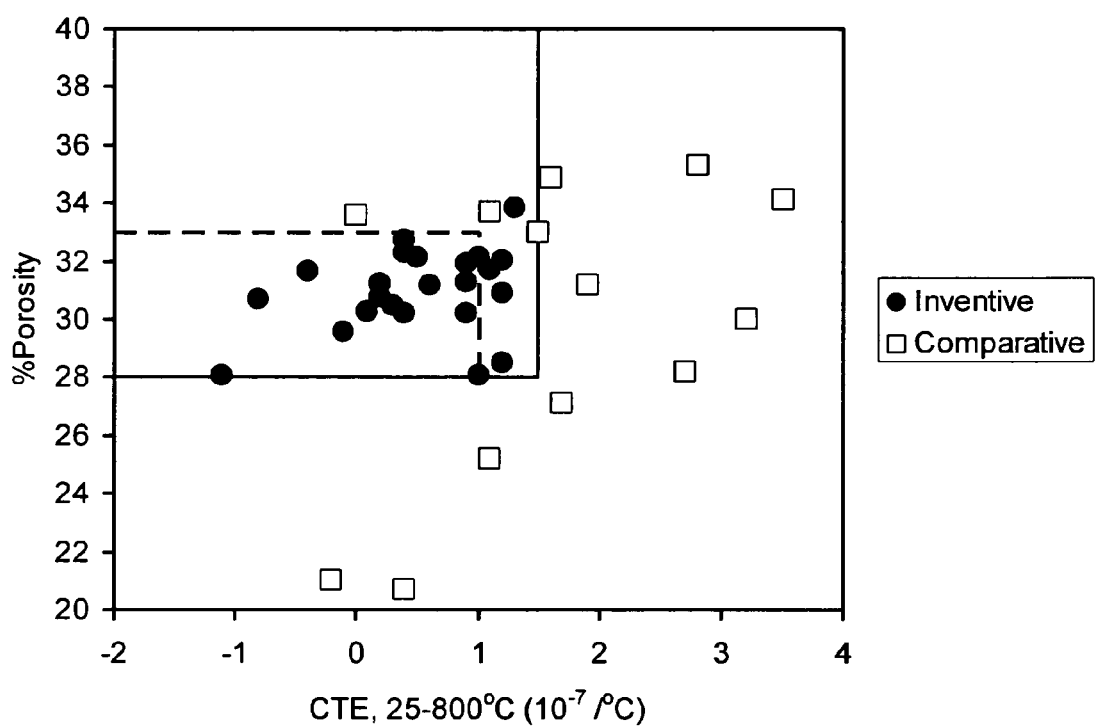
FIG. 1 illustrates a graphical plot of % Porosity versus CTE according to embodiments of the present invention and comparative embodiments.

The present invention can be understood more readily by reference to the following detailed description, examples, and claims, and their previous and following description.

Before the present compositions, devices, and/or methods are disclosed and described, it is to be understood that this invention is not limited to the specific articles, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "dispersible alumina forming source" includes aspects having two or more such dispersible alumina forming sources unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, a "weight percent" or "percent by weight" of a component, unless specifically stated to the contrary, is based on the total weight of the formulation or composition in which the component is included.

Throughout this application various publications are referenced. It should be understood that the disclosures of these publications in their entireties are hereby incorporated by reference into this application for all purposes.

The ceramic articles according to the instant invention comprise a sintered phase of cordierite, and combine the attributes of good thermal shock resistance, as a virtue of their relatively low thermal expansion coefficient, with a good washcoatability, as a virtue of their relatively high level of total porosity and relatively narrow pore size distribution.

Accordingly, in one aspect, the ceramic articles of the present invention are characterized by having an ultra-low coefficient of thermal expansion (CTE) in at least one direction. The article exhibits CTE which is less than $1.5 \times 10^{-7}/°C$. across the temperature range of from 25° C. to 800° C.; and in addition, a total porosity of at least 28%; a transverse I-ratio of less than 0.92; and a pore size distribution wherein at least 60% of the total pore volume is comprised of pores having diameters between 0.5 μm and 5.0 μm.

The CTE is measured by dilatometry on a 0.25×0.25×2 inch specimen parallel to the length of the channels, hereafter referred to as the axial direction or extrusion direction. As mentioned above, a low CTE is desired for excellent thermal shock resistance.

The I-ratio characteristic is measured through the use of x-ray diffraction analysis of a specimen taken from the cordierite honeycomb body. If the negative expansion c-axes of the crystallites comprising cordierite body are preferentially oriented in a particular direction, then the reflections measured from a slice cut normal to that direction should be more intense than if the crystallites were randomly oriented. At the same time, reflections that are diffracted from crystallographic planes parallel to the negative expansion c-axes should be less intense than when there is little or no preferred orientation. The following ratio, the I-ratio, as first described in U.S. Pat. No. 3,885,977, is used to describe the degree of orientation:

$$I(110)/[I(110)+I(002)] \tag{EQ. 3}$$

where $I(110)$ and $I(002)$ are the peak heights of the X-ray reflections from the (110) and (002) crystallographic planes respectively, based on hexagonal cordierite crystal structure; these reflections correspond to d-spacings of about 4.9 Å and 4.68 Å, respectively. The I-ratio is measured using copper Kα radiation.

The axial and transverse I-ratio refer to different orientations of a cordierite honeycomb sample in the x-ray beam. The x-ray beam impinges a planar surface at an angle. Referring specifically to the measurement of the transverse I-ratio, this measurement is taken on the planar surface of the sample when that planar surface on which the x-rays impinge is the flat surface made up of the as-formed wall surfaces of the honeycomb. Put differently, this measurement of the transverse I-ratio is performed by slicing the cordierite honeycomb substrate to expose a flat section of a web of the honeycomb and subjecting this web to X-ray diffraction and calculating the intensity of the observed diffraction peaks. If the obtained value is greater than 0.65, which is the I-ratio for a body of completely randomly oriented crystals (i.e., a powder), then it can be inferred that the cordierite crystallites have a preferred orientation; i.e., a majority of the cordierite crystallites are oriented with their c-axes in the plane of the web. A transverse I-ratio of 1.00 would imply that all of the cordierite crystallites were oriented with their negative expansion axis within the plane of the web, and thus the closer the transverse I-ratio ($I_T$) is to a value of 1.00, the higher the degree of this planar orientation. Referring specifically now to the measurement of the axial I ratio, this measurement is taken on a plane which is perpendicular to the length of the cell channels (and, therefore, also perpendicular to that for a transverse I-ratio) where the planar surface on which the x-rays impinge consists of the cross-sectional ends of the honeycomb webs. Put differently, this X-ray measurement is performed on the surface of the cordierite honeycomb that is normal to the direction of extrusion. If the axial I-ratio ($I_A$) is less than 0.65 it can again be inferred that the cordierite crystallites exhibit a preferred orientation. Specifically, since the cordierite crystallites are preferentially oriented with their c-axes in the plane of the webs, the intensity of the reflections from the (002) planes is expected to be greater than that for a body with completely randomly oriented cordierite crystallites.

Simply stated, if the I-ratio measured in the transverse direction with respect to the extrusion direction of the body exceeds about 0.65 or the axial I-ratio with respect to the extrusion direction is less than about 0.65, then the cordierite crystallites are becoming substantially oriented with their c-axes within plane of the webs. Typically, higher values of transverse I-ratio, and correspondingly lower values of axial I-ratio correlate with low values of thermal expansion measured axially, due to the greater fraction of crystals with their negative expansion c-axis being oriented in the plane of the webs.

Because the cordierite crystals within the skin on the exterior of the filter and web intersections of the cellular matrix of the honeycomb article typically do not have the same degree of crystal alignment as that of the walls, the CTE in the skin and web intersections can be different from that of the walls when the walls exhibit a high degree of alignment (high transverse I-ratio). This difference in CTE due to differences in crystal alignment can create internal stresses between the walls and the web intersections, and between the walls and the skin, when the honeycomb article is heated, even in the absence of thermal gradients. Such stresses can reduce the thermal cycling durability of the article during use. Thus, to reduce internal stresses, a transverse I-ratio less than 0.92 is desired in the present invention.

The % porosity and pore size distribution of the ceramic article are measured by mercury intrusion porosimetry. A porosity≧28% and a large fraction of pores between 0.5 and 5.0 μm are desired because these attributes contribute to an excellent washcoatability of the honeycomb article.

According to a preferred embodiment of the present invention, the composition of the ceramic article consists essentially of from about 49 to about 53 percent by weight $SiO_2$, from about 33 to about 38 percent by weight $Al_2O_3$, and from about 12 to about 16 percent by weight MgO. A composition within this range yields a high percentage of cordierite phase when fired at a sufficiently high temperature to substantially complete the reaction of the cordierite-forming raw materials. A high percentage of cordierite phase is desirable because it contributes to low CTE and high thermal shock resistance.

The ceramic honeycomb article of the first aspect of the present invention preferably exhibits a median pore diameter, $d_{50}$, that is at least 2.0 μm and not more than 4.0 μm. According to a preferred embodiment of the present invention, the value of the $d_{90}$ pore diameter is less than 15 μm, in which $d_{90}$ is the pore diameter at which 90% of the pores, by volume, are of a smaller pore diameter. It is preferred that the transverse I-ratio, $I_T$, of the honeycomb article is not more than 0.90, and more preferably not more than 0.87, to further minimize internal stresses within the honeycomb due to differential CTEs.

The mean coefficient of thermal expansion (CTE) in at least one direction within the honeycomb article is preferably not more than $1.0 \times 10^{-7}/°C$. across the temperature range of from 25° C. to 800° C., and in some embodiments is not more than $0.8 \times 10^{-7}/°C$., or in some embodiments even not more than $0.5 \times 10^{-7}/°C$.

As further mentioned above, the ceramic honeycomb articles of the instant invention may, in one aspect, also exhibit relatively good washcoatability as a virtue of their relatively high level of total porosity and a narrow pore size distribution, both as measured by mercury porosimetry on a specimen cut from the ceramic body. According to one embodiment, the total porosity, P, of the article may be ≧30%. In another embodiment, the total porosity, P, is ≦40%, or even ≦33%, to provide high strength. According to certain embodiments, the porosity, P, may be ≧30% and ≦36% to provide a good combination of washcoatability and strength.

According to embodiments of the invention, the ceramic honeycomb article exhibits a desirable combination of mean CTE from 25 to 800° C. of not more than $1.0 \times 10^{-7}/°$ C. in at least one direction, and a porosity, P, of $\geq 30\%$ thereby providing good washcoatability and excellent thermal shock resistance.

The ceramic honeycomb articles may exhibit a modulus of rupture, MOR>300 psi for a "600/4" cell geometry (600 cells per square inch, and 0.004 inch wall thickness). Additional embodiments exhibit MOR>350 psi, or even >400 psi, for a 600/4 cell geometry. The modulus of rupture, MOR, is measured by the four-point method on a 0.5×1.0×5.0 inch specimen cut parallel to the axial direction of the honeycomb article.

According to aspect of the present invention, a ceramic honeycomb article is provided comprising a phase of cordierite which exhibits a desirable combination of mean CTE<$1.0 \times 10^{-7}/°$ C. (from 25 to 800° C.) in at least one direction, and a total porosity, P, wherein $28\% \leq P \leq 33\%$.

According to embodiments of the present invention, the composition of the ceramic article consists essentially of, as expressed on an oxide basis, from about 49 to about 53 percent by weight $SiO_2$, from about 33 to about 38 percent by weight $Al_2O_3$, and from about 12 to about 16 percent by weight MgO. A composition within this range yields a high percentage of cordierite phase when fired at a sufficiently high temperature to substantially complete the reaction of the cordierite-forming raw materials. A high percentage of cordierite phase is desirable because it contributes to low CTE and high thermal shock resistance.

The ceramic honeycomb article of the second aspect of the invention preferably has a median pore diameter of not less than 2.0 μm and not greater than 6.0 μm. The transverse I-ratio is preferably not more than 0.90 to minimize thermally induced stresses between the walls and the skin or web intersections. The mean CTE of the ceramic honeycomb article from 25 to 800° C. may be $\leq 0.9 \times 10^{-7}/°$ C. in at least one direction, in some embodiments $\leq 0.3 \times 10^{-7}/°$ C., and in still other embodiment $\leq -0.4 \times 10^{-7}/°$ C. The porosity, P, of embodiments of the honeycomb article may be $\geq 30\%$. The four-point MOR measured on an axial specimen cut from the honeycomb article may be >270 psi for a "600/4" cell geometry, or even >300 psi. Several exemplary embodiments of the invention exhibit the combination of a mean CTE from 25 to 800° C. of $\leq 0.5 \times 10^{-7}/°$ C. in combination with a porosity, P, of $\geq 30\%$.

In accordance with a method of manufacturing of the present invention, an inorganic cordierite powder batch composition is provided comprising at least one talc source having a mean particle size of at least 8 μm and a Morphology Index of at least 0.30 and not more than 0.85; one or more alumina-forming sources (optionally comprising at least one dispersible alumina-forming source having a dispersed median particle size of not more than 0.5 μm), wherein the alumina-forming sources have a weighted average median particle size that does not exceed 5 μm; at least 20 weight percent of an alumino-silicate source comprising at least one raw kaolin (and, optionally, at least one calcined kaolin), wherein the weighted average median particle size of the kaolin+calcined kaolin mixture (if present) does not exceed 6 μm; and a binder system. All particle sizes herein are as measured by laser diffraction on a suspension of the powders in water or isopropyl alcohol, such as by a Microtrac particle analyzer (a product of Microtrac Inc.) unless specifically stated otherwise.

The respective raw material components preferably are selected in amounts sufficient to provide, when fired, a sintered phase composition comprising at least about 93% by weight cordierite, wherein the cordierite consists essentially of from about 49 to about 53 percent by weight $SiO_2$, from about 33 to about 38 percent by weight $Al_2O_3$, and from about 12 to about 16 percent by weight MgO.

In a further aspect of the inventive manufacturing method, the median particle size of the talc source is at least about 10 μm, at least about 12 μm, or even at least about 15 μm. In still a further aspect, the talc source has a Morphology Index of at least 0.40 and not more than 0.80, and in some embodiments, at least 0.50 and not more than 0.70.

The morphology index, as disclosed in U.S. Pat. No. 5,141,686, is a measure of the degree of platiness of the talc source. One typical procedure for measuring the morphology index is to place the sample in a holder so that the orientation of the platy talc is maximized within the plane of the sample holder. The x-ray diffraction (XRD) pattern can then be determined for the oriented talc. The morphology index, M, semi-quantitatively relates the platy character of the talc to its XRD peak intensities using the following equation:

$$M = \frac{I_{(004)}}{I_{(004)} + 2I_{(020)}} \qquad \text{EQ. 4}$$

where $I_{(004)}$ is the intensity of the (004) peak and $I_{(020)}$ is the intensity of the (020) reflection, which is partially overlapped by the (111-) and (110) peaks. Another measure of the platiness of the talc particle is the ratio of the median particle size as measured by laser diffraction divided by the median particle size as measured by sedimentation, such as by a Sedigraph particle analyzer. This ratio is about 1.0 for a spherical particle, and increases with increasing platiness of the particle. In the present invention, this ratio for the particles of the talc source is preferably not more than 2.5, and in some embodiments not more than 2.0.

An alumina-forming source refers to an aluminum oxide or a compound containing aluminum which when heated to sufficiently high temperature yields essentially 100% aluminum oxide. Non-limiting examples of alumina forming sources include corundum or alpha-alumina, transition aluminas such as gamma-alumina and rho-alumina, aluminum hydroxide such as gibbsite and bayerite, boehmite, diaspore, aluminum isopropoxide, and the like.

The alumina-forming sources present within the inorganic powder batch composition preferably also comprise at least one dispersible alumina-forming source. As used herein, a dispersible alumina-forming source is an alumina forming source that is at least substantially dispersible in a solvent or liquid medium and that can be used to provide a colloidal suspension in a solvent or liquid medium. In one aspect, a dispersible alumina-forming source can be a relatively high surface area alumina-forming source having a specific surface area of at least 20 $m^2/g$. Alternatively, a dispersible alumina-forming source may have a specific surface area of at least 50 $m^2/g$. The primary particle diameter of the dispersed alumina-forming source is preferably less than 0.5 μm, and in some embodiments less than 0.2 μm. In an exemplary aspect, a suitable dispersible alumina-forming source for use in the methods of the instant invention comprises alpha aluminum oxide hydroxide ($AlOOH.xH_2O$) commonly referred to as boehmite, pseudoboehmite, and as aluminum monohydrate. In another exemplary aspect, the dispersible alumina-forming source can comprise the so-called transition or activated aluminas (i.e., aluminum oxyhydroxide and alumina trihydroxides and chi, eta, rho, iota, kappa, gamma, delta, and theta alumina) which can contain various amounts of chemically bound water or hydroxyl functionalities.

While the dispersible alumina can be used in any amount sufficient to enable the formation of a cordierite body as described herein, in one aspect, the at least one dispersible alumina is present in an amount of at least 1 wt. % relative to the total weight of the inorganic powder batch composition. In another aspect, the at least one dispersible alumina forming source is present in an amount that does not exceed about 5 wt % relative to the total weight of the inorganic powder batch composition. In still another aspect, the at least one dispersible alumina forming source is present in an amount in the range of from approximately 1 wt % to approximately 5 wt % percent relative to the total weight of the inorganic powder batch composition.

In still a further aspect, the weighted average median particle diameter of the alumina forming sources present in the inorganic powder batch composition should not exceed about 5 µm, including weighted average median particle sizes that do not exceed 3 µm, and even that do not exceed 1 µm. The weighted average of the median particle sizes of the alumina-forming sources is defined as:

$$d_{50}(Al_2O_3\text{-forming sources}) = \frac{(W_{Al-1})(d_{50,Al-1}) + (W_{Al-2})(d_{50,Al-2}) + \ldots + (W_{Al-n})(d_{50,Al-n})}{(W_{Al-1}) + (W_{Al-2}) + \ldots + (W_{Al-n})}$$

where W is the weight percentage of each alumina-forming source in the raw material mixture, $d_{50}$ is the median particle size of each alumina-forming source, and Al-1, Al-2, . . . Al-n represent each alumina-forming source used in the mixture. It is preferred that none of the individual alumina-forming sources have a median particle size greater than 2 µm.

The alumino-silicate source comprises at least one raw kaolin and, optionally, at least one calcined kaolin. To this end, the weighted average median particle size of the kaolin mixture in one aspect, does not exceed approximately 6 µm, approximately 5 µm, or approximately 4 µm. The amount of alumino-silicate source (preferably comprising at least one raw kaolin, and optionally at least one calcined kaolin) is at least 20 wt %, preferably at least 30 wt %, and more preferably at least 40%.

In a further aspect, the raw material mixture may further comprise, if desired, a silica raw material including fused $SiO_2$; colloidal silica; crystalline silica, such as quartz or cristobalite, cryptocrystalline silica, diatomaceous silica, or a low-alumina substantially alkali-free zeolite. Further, in still another aspect, the silica source can comprise a compound that forms free silica when heated, such as for example, silicic acid or a silicon organometallic compound. The median particle size of the silica source is preferably not greater than 10 µm.

In still another aspect, the silica source is at least substantially absent of a non-crystalline silica. As used herein, at least substantially absent includes amounts less than approximately 10 wt %, less than 5 wt %, less than 4 wt %, less than 3 wt %, less than 2 wt %, or even less than 1 wt %, relative to the total weight of the inorganic powder batch composition. Alternatively, in still another aspect, at least substantially absent refers to a complete or total absence of non-crystalline silica.

The inorganic powder batch composition comprising the aforementioned raw materials can then be mixed together with a binder system to provide a plasticized cordierite precursor composition and to provide an extrudable mixture that is formable and/or moldable. In one aspect, the binder system for use in the present invention comprises a cellulose ether binder component. The binder component may be selected from the group consisting of methylcellulose, methylcellulose derivatives, and combinations thereof. The system may further include a surfactant component, preferably stearic acid or sodium stearate, and a solvent component, preferably comprising water. In one aspect, the binder system can comprises the following amounts, assuming 100 parts by weight of the cordierite precursor batch composition: about 0.2 to 2 parts by weight of stearic acid, about 2.5 to 6.0 parts by weight of a methylcellulose or a hydroxypropyl methylcellulose binder, and about 20-50 parts by weight of the water.

The individual components of the binder system can be mixed together with the cordierite precursor batch composition in any suitable known manner to prepare an intimate mixture of the ceramic material and the binder system capable of being formed into a ceramic body by, for example, extrusion. For example, all components of the binder system may be previously mixed with each other, and the binder mixture can then be mixed together with the cordierite precursor batch composition. In this case, the entire portion of the binder system may be added at one time, or divided portions of the binder system may be added one after another at suitable intervals. Alternatively, the components of binder system may be added to the cordierite precursor batch composition one after another, or each previously prepared mixture of two or more components of the binder system may be added to the cordierite precursor batch composition. Further, the binder system may be first mixed with a portion of the cordierite precursor batch composition. In this case, the remaining portion of the cordierite precursor batch composition is subsequently added to the prepared mixture. In any case, the binder system should be uniformly mixed with the cordierite precursor batch composition in a predetermined portion. To this end, in one aspect, uniform mixing of the binder system and the inorganic cordierite precursor powder batch composition can be accomplished by, for example, a known conventional kneading process.

The resulting stiff, uniform, and extrudable plasticized cordierite precursor batch composition can then be shaped into a green body by any known conventional ceramic forming process, such as, e.g., extrusion, injection molding, slip casting, centrifugal casting, pressure casting, dry pressing, and the like. For the preparation of a thin-walled honeycomb substrate suitable for use as a catalyst support, extrusion through a die is preferred.

The prepared ceramic green body having a honeycomb configuration may then be dried for a period of, for example, about 5-20 minutes prior to firing by any conventional method such as either hot-air or dielectric drying. Once dried, the honeycomb green body can thereafter be fired under conditions effective to convert the green body into a ceramic honeycomb article comprising a sintered phase cordierite composition as described herein.

In accordance with the present inventive method, the ceramic honeycomb green body is fired by heating the body from room temperature to 1050° C. at an average heating rate of between 5 and 100° C./hr, then from 1050 to 1390° C. at a rate of at least 30° C./hr, and held at a temperature of at least 1390° C. for a hold time sufficient to substantially complete the reaction of the raw materials into a phase of cordierite. The hold time is preferably 5 to 16 hours. The maximum firing temperature is preferably not more than 1420° C. The maximum firing temperature is preferably 1400 to 1410° C.

The heating rate from 1380 to 1400° C. is preferably not more than 100° C./hr, and more preferably is less than 30° C./hr.

In still another aspect, the firing conditions effective to convert the plasticized batch composition into a ceramic honeycomb article according to the instant invention may depend specifically on the weighted average median particle size of the alumina forming sources present within the plasticized cordierite precursor composition. For example, when the weighted average median particle size of the alumina forming component is less than 1 µm, the firing conditions effective to convert the green body into the ceramic article comprise firing the green body to a temperature of at least 1390° C. and preferably at least 1400° C. and holding this temperature for a sufficient soak time as set forth above. Alternatively, when the weighted average median particle size of the alumina forming component is in the range of from 1 µm to 3 µm, the firing conditions effective to convert the green body into the ceramic article comprise firing the green body to a temperature of at least 1400° C. and preferably at least 1405° C. and holding this temperature for a sufficient soak time as set forth above. In still another aspect, when the weighted average median particle size of the alumina forming component is greater than approximately 3 µm, the firing conditions effective to convert the green body into the ceramic article comprise firing the green body to a temperature of at least 1405° C. and preferably at least 1410° C. and once again holding this temperature for a sufficient soak time as set forth above.

A primary utility of the mixtures described herein is for preparing relatively high strength, relatively low CTE thin walled cordierite honeycomb substrates useful as catalyst carriers. Generally, honeycomb cell densities range from 235 cells/cm$^2$ (about 1500 cells/in$^2$) to 15 cells/cm$^2$ (about 100 cells/in$^2$). Further, the wall or web thicknesses typically range from about 0.07 mm to about 0.63 mm (about 3 mils to about 25 mils). It should however be understood that the particular desired size and shape of the ceramic body can depend on the application, e.g., in automotive applications by engine size and space available for mounting, etc. To this end, although the ceramic articles of the instant invention are, in one aspect, suitable for preparing thin-walled honeycombs, the claimed mixtures can also be used for thicker walled structures. Further, methods of applying catalysts to the honeycomb structures, and utilizing those structures, for example, in automobile exhaust systems, are well known in the art. The mixtures may also be useful for preparing other high strength cordierite structures, such as filters.

EXAMPLES

To further illustrate the principles of the present invention, the following examples are put forth so as to provide those of ordinary skill in the art with a complete disclosure and description of how the ceramic articles and methods claimed herein are made and evaluated, and are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric.

It should also be understood that while the present invention has been described in detail with respect to certain illustrative and specific aspects thereof, it should not be considered limited to such, as numerous modifications are possible without departing from the broad spirit and scope of the present invention as defined in the appended claims.

A series of inventive and non-inventive comparative cordierite honeycomb structures were prepared using various combinations of starting raw materials, including, powdered talc, kaolin, calcined kaolin, alumina-forming sources, silica, binder, lubricant and/or surfactant. Various properties for the starting materials are set forth in Table 1. Median particle diameters (MPD) were measured by laser diffraction on a suspension of the powders in a liquid using a Microtrac particle analyzer (a product of Microtrac Inc.). For some materials, the median particle diameter was also determined by a sedimentation technique using a Sedigraph particle size analyzer (product of Micrometrics® Instrument Corporation). Table 1 reports the ratio of ratio of MPD (Microtrac)/MPD (Sedigraph) for some of the raw materials, which is proportional to the platiness of the particles of those raw materials.

The specific inventive and non-inventive inorganic powder batch compositions used to prepare the cordierite honeycomb structures are set forth in Tables 2 and 3, respectively. Approximately 2.9% methylcellulose was also added into each batch composition as a binder. The raw materials were placed in a Littleford mixer. The resulting mixtures were dry blended for approximately 5 minutes.

The dry batch compositions were introduced back into a Littleford mixer for a liquid addition. The Littleford mixer was used for the preparation of thin wall and ultra thin wall batches in order to ensure a uniform addition of the liquids. The liquid addition included approximately 0.6% surfactant, approximately 5% lubricant, and approximately 24% distilled water. After the liquid addition, the compositions were mixed for approximately 3-5 minutes. The resulting mixture was then mulled in a large muller for approximately 5-20 minutes to provide a final plasticized ceramic batch mixture.

Each of the plasticized batches was then extruded under conditions suitable to form wet or green honeycomb bodies (wares) that were approximately 4-5 inches (100 to 125 mm) in diameter having approximately 600 cells/in$^2$ and a web thickness of about 4 to 5 mil (100 to 125 µm). The wet honeycomb wares (about 7-8" long) were then dried immediately using a microwave furnace to reach greater than 90% drying. A gas furnace was then used to remove any additional organics, to dehydrate the raw materials, and then to fire the green bodies and form the cordierite crystals.

The resulting inventive and comparative fired cordierite bodies were then evaluated to determine their relevant physical properties, such as for example, CTE, total porosity (P), intrusion volume, $d_{10}$, median pore diameter ($d_{50}$), $d_{90}$, pore size distribution, elastic modulus at room temperature, modulus of rupture (MOR), secondary phases, and I-ratio in various directions. CTE was measured by dilatometry in both the axial direction (parallel to the cell channels) and radial direction (parallel to the plane of the wall but orthogonal to the axial direction). All measurements of pore microstructure were made by mercury porosimetry. The meaning of $d_{90}$ has been defined previously. The value $d_{10}$ is the pore diameter at which 10% of the pores, by volume, are of a smaller pore diameter. The percentage of total pore volume (% TPV) between two pore diameters is computed as the cumulative mercury intrusion volume at the smaller pore diameter minus the cumulative mercury intrusion volume at the larger pore diameter, divided by the total mercury intrusion pore volume of the specimen, and multiplied by 100. Elastic (Young's) modulus was measured on a cellular bar in the axial direction using a sonic resonance technique. Modulus of rupture was measured on a cellular bar in the axial direction by the four-point method. Measurement of the transverse and axial I-ratio has been described above. Secondary phases are reported on a weight percent basis, and were measured by x-ray diffractometry of a powered sample using previously prepared standards. The results of these and other tests are reported in Tables 4-8 and are discussed below.

Table 4 provides inventive examples for which the mean CTE from 25 to 800° C. is <1.5×10$^{-7}$/° C., the porosity, P, is greater than 28%, pores having a diameter of 0.5 to 5.0 μm comprise at least 60% of the total pore volume, and the transverse I-ratio ($I_T$) is less than 0.92. This combination of properties has not previously been demonstrated in the prior art. Specifically, the examples in Table 4 exhibit a mean CTE from 25 to 800° C. of 1.0 to 1.3×10$^{-7}$/° C., a porosity of 28-34%, 63 to 77% of the total pore volume being comprised of pores having diameters between 0.5 μm and 5.0 μm, and transverse I-ratio ($I_T$) from 0.85 to 0.91. Median pore diameters range from 2.2 μm to 3.9 μm, and flexural strengths (MOR values) of 600/4 honeycomb are from 353 to 417 psi. The porosities of the inventive examples are plotted against their mean CTE from 25 to 800° C. in FIG. 1.

Tables 5 and 6 provide inventive examples of the honeycomb article for which the mean CTE from 25 to 800° C. is less than 1.0×10$^{-7}$/° C., and porosity, P, is between 28% and 33%. This combination of properties has also not previously been demonstrated in the prior art. Specifically, the examples in Tables 5 and 6 exhibit a mean CTE from 25 to 800° C. of −1.1×10$^{-7}$/° C. to 0.9×10$^{-7}$/° C., and porosities from 28% to 33%. Median pore diameters are from 2 to 12 μm, and flexural strengths are from 272 to 369 psi.

Tables 7 and 8 provide comparative, non-inventive examples for which the combination of raw materials and firing conditions do not yield the combination of properties of the ceramic articles of the present invention. Examples C1 to C6 do not achieve a mean CTE from 25 to 800° C. of less than 1.5×10$^{-7}$/° C. Examples C7 to C9 do not possess a transverse I-ratio ($I_T$) less than 0.92. Examples C10 to C12 exhibit porosities of less than 28%. The porosities of the comparative examples are plotted (as hollow squares) against their mean CTE from 25 to 800° C. in FIG. 1.

TABLE 1

| Raw Material | Median Particle Diameter by Microtrac (μm) | Median Particle Diameter by Sedigraph (μm) | Talc Morphology Index | MPD (Microtrac) ÷ MPD (Sedigraph) |
|---|---|---|---|---|
| Talc A | 14.4 | 8.0 | 0.65 | 1.8 |
| Talc B | 8.5 | — | 0.60 | — |
| Talc C | 5.5 | 1.6 | 0.88 | 3.4 |
| Talc D | 10.0 | 3.4 | 0.90 | 2.9 |
| Alumina A | 6.4 | 4.5 | — | 1.4 |
| Alumina B | 0.7 | — | — | — |
| Alumina C | 0.6 | 0.4 | — | 1.5 |
| Boehmite A | 0.15 | — | — | — |
| Kaolin A | 4.0 | 0.8 | — | 5.0 |
| Kaolin B | 11.3 | 7.4 | — | 1.5 |
| Calcined Kaolin X | 3.0 | 1.6 | — | 1.9 |
| Quartz A | 4.6 | 4.6 | — | 1.0 |

TABLE 2

Inventive batch compositions (parts by weight)

| Composition | Talc A | Talc B | Calcined Kaolin X | Kaolin A | Alumina A | Alumina B | Boehmite A | Quartz A |
|---|---|---|---|---|---|---|---|---|
| A | 30.4 | 10.1 | 24.0 | 18.6 | 0 | 15.0 | 0 | 2.0 |
| B | 41.1 | 0 | 19.2 | 14.9 | 0 | 16.8 | 2.0 | 6.0 |
| C | 39.0 | 0 | 6.8 | 32.9 | 8.7 | 1.9 | 6.8 | 3.9 |
| D | 31.3 | 10.1 | 19.1 | 14.8 | 0 | 16.7 | 2.0 | 6.0 |
| E | 31.2 | 10.1 | 19.1 | 14.8 | 4.2 | 12.7 | 2.0 | 6.0 |
| F | 30.9 | 10.3 | 14.6 | 11.3 | 0 | 20.9 | 2.0 | 10.0 |
| G | 30.5 | 10.2 | 19.3 | 15.0 | 0 | 16.9 | 2.0 | 6.0 |
| H | 30.5 | 10.2 | 19.3 | 15.0 | 8.5 | 8.5 | 2.0 | 6.0 |
| I | 40.3 | 0 | 23.9 | 18.5 | 10.9 | 2.4 | 2.0 | 2.0 |
| J | 30.4 | 10.1 | 24.0 | 18.6 | 3.7 | 11.2 | 0 | 2.0 |
| K | 30.6 | 10.2 | 19.4 | 15.0 | 0 | 18.8 | 0 | 6.0 |
| L | 41.0 | 0 | 19.2 | 14.9 | 0 | 16.8 | 2.0 | 6.0 |
| M | 0 | 41.1 | 19.2 | 14.9 | 0 | 16.8 | 2.0 | 6.0 |
| N | 30.6 | 10.2 | 19.4 | 15.0 | 0 | 18.8 | 0 | 6.0 |
| O | 30.7 | 10.2 | 21.9 | 15.5 | 2.7 | 12.8 | 2.1 | 4.2 |

TABLE 3

Non-inventive batch compositions (parts by weight)

| Composition | Talc A | Talc C | Talc D | Calcined Kaolin X | Kaolin A | Kaolin B | Alumina C | Boehmite A | Quartz A |
|---|---|---|---|---|---|---|---|---|---|
| P | 0 | 42.3 | 0 | 0 | 0 | 0 | 34.2 | 0 | 23.5 |
| Q | 0 | 39.6 | 0 | 0 | 0 | 47.1 | 13.3 | 0 | 0 |
| R | 42.3 | 0 | 0 | 0 | 0 | 0 | 34.2 | 0 | 23.5 |
| S | 0 | 0 | 41.1 | 0 | 19.5 | 0 | 25.6 | 0 | 13.8 |
| T | 0 | 41.0 | 0 | 35.7 | 7.3 | 0 | 5.5 | 10.5 | 0 |
| U | 0 | 0 | 42.3 | 0 | 0 | 0 | 34.2 | 0 | 23.5 |
| V | 0 | 41.9 | 0 | 0 | 0 | 0 | 28.9 | 5.8 | 23.3 |
| W | 0 | 40.3 | 0 | 29.2 | 14.1 | 0 | 2.7 | 13.7 | 0 |
| X | 0 | 40.7 | 0 | 35.4 | 7.3 | 0 | 2.7 | 13.9 | 0 |
| Y | 0 | 39.9 | 0 | 0 | 0 | 0 | 0 | 37.9 | 22.2 |

TABLE 4

Examples of inventive compositions & firing schedules

| | Example Number | | | | | | |
|---|---|---|---|---|---|---|---|
| | 1 | 2 | 3 | 4 | 5 | 6 | 7 |
| | | | | Composition | | | |
| | A | B | B | B | C | D | E |
| MPS of Talc Sources (μm) | 12.9 | 14.4 | 14.4 | 14.4 | 14.4 | 13.0 | 13.0 |
| MPS of Alumina-Forming Sources (μm) | 0.7 | 0.6 | 0.6 | 0.6 | 3.3 | 0.6 | 1.9 |
| MPS of Kaolin Source (μm) | 4.0 | 4.0 | 4.0 | 4.0 | 4.0 | 4.0 | 4.0 |
| MPS of Calcined Kaolin Source (μm) | 3.0 | 3.0 | 3.0 | 3.0 | 3.0 | 3.0 | 3.0 |
| MPS of Kaolin + Calcined kaolin Sources (μm) | 3.4 | 3.4 | 3.4 | 3.4 | 3.8 | 3.4 | 3.4 |
| Wt % Dispersible Boehmite | 0.0 | 2.0 | 2.0 | 2.0 | 6.8 | 2.0 | 2.0 |
| Tmax (° C.) | 1405 | 1400 | 1400 | 1400 | 1405 | 1405 | 1405 |
| Hold Time (hour) | 7.5 | 6 | 8 | 6 | 7.5 | 7.5 | 7.5 |
| 700-900° C. Heating Rate (° C./hour) | 111 | 100 | 70 | 80 | 111 | 111 | 111 |
| 900-1050° C. Heating Rate (° C./hour) | 67 | 100 | 70 | 80 | 67 | 67 | 67 |
| 1050-1150° C. Heating Rate (° C./hour) | 40 | 100 | 70 | 80 | 40 | 40 | 40 |
| 1150-1200° C. Heating Rate (° C./hour) | 40 | 100 | 70 | 80 | 40 | 40 | 40 |
| 1200-1380° C. Heating Rate (° C./hour) | 28 | 100 | 70 | 80 | 28 | 28 | 28 |
| 1380-1400° C. Heating Rate (° C./hour) | 28 | 100 | 70 | 80 | 28 | 28 | 28 |
| 1400° C. - Tmax Heating Rate (° C./hour) | 3 | — | — | — | 3 | 3 | 3 |
| Axial CTE, 25-800° C. ($10^{-7}$/° C.) | 1.0 | 1.0 | 1.1 | 1.2 | 1.2 | 1.2 | 1.3 |
| Radial CTE, 25-800° C. ($10^{-7}$/° C.) | 4.5 | 2.7 | 3.2 | 5.6 | 6.4 | 5.5 | 5.3 |
| Radial CTE – Axial CTE ($10^{-7}$/° C.) | 3.5 | 1.7 | 2.1 | 4.4 | 5.2 | 4.3 | 4.0 |
| % Porosity | 28.1 | 32.1 | 31.7 | 30.9 | 28.5 | 32.0 | 33.9 |
| Intrusion Volume (ml/g) | 0.1539 | 0.1831 | 0.1740 | 0.1846 | 0.1469 | 0.1712 | 0.1831 |
| $d_{10}$ (μm) | 0.8 | 1.6 | 1.2 | 1.4 | 0.9 | 1.0 | 1.0 |
| $d_{50}$ (μm) | 2.3 | 3.9 | 3.2 | 3.5 | 2.2 | 2.7 | 3.2 |
| $d_{90}$ (μm) | 13.3 | 14.5 | 9.4 | 9.9 | 9.8 | 15.3 | 15.7 |
| % TPV < 0.5 μm | 4.5 | 1.5 | 2.1 | 2.1 | 2.7 | 2.7 | 2.3 |
| % TPV 0.5-1 μm | 10.2 | 2.7 | 4.4 | 3.8 | 9.0 | 8.4 | 7.1 |
| % TPV 1-2 μm | 30.6 | 10.6 | 17.9 | 14.0 | 33.3 | 27.1 | 23.2 |
| % TPV 2-5 μm | 27.3 | 51.3 | 49.8 | 52.2 | 35.1 | 30.5 | 33.2 |
| % TPV 5-10 μm | 13.1 | 21.0 | 16.7 | 18.2 | 10.4 | 14.2 | 17.8 |
| % TPV 10-20 μm | 8.4 | 6.5 | 6.8 | 6.8 | 6.5 | 10.2 | 9.4 |
| % TPV 20-40 μm | 4.4 | 2.9 | 2.0 | 2.3 | 1.9 | 4.9 | 5.1 |
| % TPV > 40 μm | 1.5 | 3.6 | 0.3 | 0.7 | 1.2 | 1.4 | 1.7 |
| % TPV 0.5-5 μm | 68.1 | 64.6 | 72.1 | 70.0 | 77.4 | 66.0 | 63.5 |
| % TPV > 10 μm | 14.3 | 13.0 | 9.1 | 9.8 | 9.6 | 16.6 | 16.3 |
| Modulus of Rupture (psi) | 353 | — | — | — | — | 417 | 366 |
| Elastic Modulus at 25° C. ($10^6$ psi) | 0.84 | — | — | — | — | 0.89 | 0.79 |
| MOR/E at 25° C. | 0.042% | — | — | — | — | 0.047% | 0.047% |
| Transverse I-Ratio ($I_T$) | 0.87 | 0.85 | 0.86 | 0.87 | 0.91 | 0.89 | 0.89 |
| Axial I-Ratio ($I_A$) | 0.41 | 0.48 | 0.44 | 0.43 | 0.35 | 0.38 | 0.40 |
| % Alumina | 0 | 0 | 0 | 0 | 0 | 0 | 0 |
| % Mullite | 1.2 | 0.6 | 0 | 0.6 | 0.5 | 0.9 | 1 |
| % Spinel | 0.6 | 1.5 | 1.3 | 1.4 | 1.1 | 0 | 0 |

TABLE 5

Examples for inventive compositions & firing schedules

| | Example Number | | | | | | | |
|---|---|---|---|---|---|---|---|---|
| | 8 | 9 | 10 | 11 | 12 | 13 | 14 | 15 |
| | | | | Composition | | | | |
| | A | D | F | G | H | I | D | J |
| MPS of Talc Sources (μm) | 12.9 | 13.0 | 12.9 | 12.9 | 12.9 | 14.4 | 13.0 | 12.9 |
| MPS of Alumina-Forming Sources (μm) | 0.7 | 0.6 | 0.6 | 0.6 | 3.2 | 4.7 | 0.6 | 2.1 |
| MPS of Kaolin Source (μm) | 4.0 | 4.0 | 4.0 | 4.0 | 4.0 | 4.0 | 4.0 | 4.0 |
| MPS of Calcined Kaolin Source (μm) | 3.0 | 3.0 | 3.0 | 3.0 | 3.0 | 3.0 | 3.0 | 3.0 |
| MPS of Kaolin + Calcined kaolin Sources (μm) | 3.4 | 3.4 | 3.4 | 3.4 | 3.4 | 3.4 | 3.4 | 3.4 |
| Wt % Dispersible Boehmite | 0.0 | 2.0 | 2.0 | 2.0 | 2.0 | 2.0 | 2.0 | 0.0 |
| Tmax (° C.) | 1410 | 1410 | 1410 | 1410 | 1410 | 1410 | 1410 | 1405 |
| Hold Time (hour) | 10 | 10 | 10 | 10 | 10 | 10 | 10 | 7.5 |
| 700-900° C. Heating Rate (° C./hour) | 111 | 111 | 111 | 111 | 111 | 111 | 111 | 111 |
| 900-1050° C. Heating Rate (° C./hour) | 67 | 67 | 67 | 67 | 67 | 67 | 67 | 67 |
| 1050-1150° C. Heating Rate (° C./hour) | 85 | 85 | 85 | 100 | 100 | 100 | 100 | 40 |
| 1150-1200° C. Heating Rate (° C./hour) | 80 | 80 | 80 | 80 | 80 | 80 | 80 | 40 |
| 1200-1380° C. Heating Rate (° C./hour) | 80 | 80 | 80 | 80 | 80 | 80 | 80 | 28 |

TABLE 5-continued

Examples for inventive compositions & firing schedules

| | Example Number | | | | | | | |
|---|---|---|---|---|---|---|---|---|
| | 8 | 9 | 10 | 11 | 12 | 13 | 14 | 15 |
| | | | | Composition | | | | |
| | A | D | F | G | H | I | D | J |
| 1380-1400° C. Heating Rate (° C./hour) | 20 | 20 | 20 | 20 | 20 | 20 | 20 | 28 |
| 1400° C. - Tmax Heating Rate (° C./hour) | 20 | 20 | 20 | 20 | 20 | 20 | 20 | 3 |
| Axial CTE, 25-800° C. ($10^{-7}$/° C.) | −1.1 | −0.8 | −0.4 | −0.1 | 0.1 | 0.2 | 0.2 | 0.3 |
| Radial CTE, 25-800° C. ($10^{-7}$/° C.) | 1.6 | — | 3.3 | — | 2.4 | 2.0 | 2.6 | 4.8 |
| Radial CTE − Axial CTE ($10^{-7}$/° C.) | 2.7 | — | 3.7 | — | 2.3 | 1.8 | 2.4 | 4.5 |
| % Porosity | 28.1 | 30.7 | 31.7 | 29.6 | 30.3 | 30.7 | 31.3 | 30.5 |
| Intrusion Volume (ml/g) | 0.1471 | 0.1656 | 0.1770 | 0.1701 | 0.1713 | 0.1690 | 0.1709 | 0.1655 |
| $d_{10}$ (μm) | 1.3 | 1.8 | 1.4 | 1.7 | 2.9 | 2.1 | 2.0 | 0.7 |
| $d_{50}$ (μm) | 5.1 | 5.2 | 5.0 | 5.2 | 6.9 | 5.2 | 5.4 | 2.4 |
| $d_{90}$ (μm) | 17.5 | 19.1 | 16.7 | 16.2 | 20.0 | 16.3 | 17.9 | 16.6 |
| % TPV < 0.5 μm | 5.7 | 3.2 | 4.7 | 3.3 | 1.3 | 1.4 | 3.0 | 5.9 |
| % TPV 0.5-1 μm | 2.6 | 1.9 | 2.4 | 2.1 | 1.4 | 1.5 | 1.9 | 11.9 |
| % TPV 1-2 μm | 7.4 | 6.5 | 8.1 | 7.0 | 2.7 | 5.9 | 4.9 | 26.7 |
| % TPV 2-5 μm | 32.8 | 36.1 | 33.9 | 35.1 | 23.5 | 37.8 | 34.7 | 24.2 |
| % TPV 5-10 μm | 28.4 | 28.6 | 29.0 | 30.9 | 42.8 | 33.6 | 32.3 | 13.8 |
| % TPV 10-20 μm | 15.3 | 14.6 | 14.5 | 15.0 | 18.3 | 12.2 | 15.0 | 9.7 |
| % TPV 20-40 μm | 6.1 | 6.8 | 5.7 | 6.1 | 6.2 | 4.5 | 7.0 | 5.4 |
| % TPV > 40 μm | 1.8 | 2.5 | 1.7 | 0.5 | 3.8 | 3.1 | 1.3 | 2.4 |
| % TPV 0.5-5 μm | 42.8 | 44.5 | 44.4 | 44.2 | 27.6 | 45.2 | 41.5 | 62.8 |
| % TPV > 10 μm | 23.2 | 23.9 | 21.9 | 21.6 | 28.3 | 19.8 | 23.3 | 17.5 |
| Modulus of Rupture (psi) | — | — | 287 | 348 | 315 | 279 | 294 | — |
| Elastic Modulus at 25° C. ($10^6$ psi) | — | — | — | 0.62 | 0.62 | 0.62 | 0.69 | 0.86 |
| MOR/E at 25° C. | — | — | — | 0.056% | 0.051% | 0.045% | 0.043% | — |
| Transverse I-Ratio ($I_T$) | 0.86 | 0.88 | 0.88 | 0.87 | 0.89 | 0.88 | 0.86 | 0.88 |
| Axial I-Ratio ($I_A$) | 0.44 | 0.40 | 0.44 | 0.43 | 0.42 | 0.42 | 0.43 | 0.42 |
| % Alumina | 0.7 | 0 | 0 | 0 | 0 | 0 | 0 | 0 |
| % Mullite | 1.5 | 1.5 | 1.2 | 0.9 | 1.6 | 1.7 | 1.0 | 1.2 |
| % Spinel | 0 | 0 | 1.4 | 0.6 | 0.9 | 0.9 | 0 | 0.5 |

TABLE 6

Examples for inventive compositions & firing schedules

| | Example Number | | | | | | | |
|---|---|---|---|---|---|---|---|---|
| | 16 | 17 | 18 | 19 | 20 | 21 | 22 | 23 |
| | | | | Composition | | | | |
| | F | K | L | M | I | N | O | O |
| MPS of Talc Sources (μm) | 12.9 | 12.9 | 14.4 | 8.5 | 14.4 | 12.9 | 12.9 | 12.9 |
| MPS of Alumina-Forming Sources (μm) | 0.6 | 0.7 | 0.6 | 0.6 | 4.7 | 0.7 | 1.5 | 1.5 |
| MPS of Kaolin Source (μm) | 4.0 | 4.0 | 4.0 | 4.0 | 4.0 | 4.0 | 4.0 | 4.0 |
| MPS of Calcined Kaolin Source (μm) | 3.0 | 3.0 | 3.0 | 3.0 | 3.0 | 3.0 | 3.0 | 3.0 |
| MPS of Kaolin + Calcined kaolin Sources (μm) | 3.4 | 3.4 | 3.4 | 3.4 | 3.4 | 3.4 | 3.4 | 3.4 |
| Wt % Dispersible Boehmite | 2.0 | 0.0 | 2.0 | 2.0 | 2.0 | 0.0 | 2.1 | 2.1 |
| Tmax (° C.) | 1405 | 1410 | 1400 | 1410 | 1410 | 1410 | 1405 | 1410 |
| Hold Time (hours) | 7.5 | 10 | 6 | 10 | 10 | 10 | 7.5 | 10 |
| 700-900° C. Heating Rate (° C./hour) | 111 | 111 | 80 | 111 | 111 | 111 | 111 | 111 |
| 900-1050° C. Heating Rate (° C./hour) | 67 | 67 | 80 | 67 | 67 | 67 | 67 | 67 |
| 1050-1150° C. Heating Rate (° C./hour) | 40 | 85 | 80 | 100 | 85 | 100 | 40 | 100 |
| 1150-1200° C. Heating Rate (° C./hour) | 40 | 80 | 80 | 80 | 80 | 80 | 40 | 80 |
| 1200-1380° C. Heating Rate (° C./hour) | 28 | 80 | 80 | 80 | 80 | 80 | 28 | 80 |
| 1380-1400° C. Heating Rate (° C./hour) | 28 | 20 | 80 | 20 | 20 | 20 | 28 | 20 |
| 1400° C. - Tmax Heating Rate (° C./hour) | 3 | 20 | — | 20 | 20 | 20 | 3 | 20 |
| Axial CTE, 25-800° C. ($10^{-7}$/° C.) | 0.4 | 0.4 | 0.4 | 0.5 | 0.6 | 0.9 | 0.9 | 0.9 |
| Radial CTE, 25-800° C. ($10^{-7}$/° C.) | 4.5 | 3.3 | 3.2 | 4.6 | 2.9 | 4.0 | — | 2.0 |
| Radial CTE − Axial CTE ($10^{-7}$/° C.) | 4.1 | 2.9 | 2.8 | 4.1 | 2.3 | 5.4 | — | 1.1 |
| % Porosity | 30.2 | 32.3 | 32.7 | 32.1 | 31.2 | 31.9 | 30.2 | 31.3 |
| Intrusion Volume (ml/g) | 0.1719 | 0.1760 | 0.1920 | 0.1745 | 0.1709 | 0.1855 | 0.1693 | 0.1782 |
| $d_{10}$ (μm) | 0.9 | 1.7 | 1.3 | 2.0 | 1.6 | 1.6 | 0.9 | 1.5 |
| $d_{50}$ (μm) | 2.8 | 5.0 | 3.4 | 11.5 | 4.5 | 4.7 | 2.4 | 4.4 |
| $d_{90}$ (μm) | 15.2 | 17.8 | 12.4 | 31.9 | 13.6 | 15.0 | 14.7 | 16.6 |
| % TPV < 0.5 μm | 3.9 | 3.5 | 3.0 | 3.0 | 2.8 | 2.6 | 3.0 | 3.1 |
| % TPV 0.5-1 μm | 7.9 | 2.1 | 3.9 | 2.5 | 2.3 | 2.3 | 9.0 | 2.7 |
| % TPV 1-2 μm | 24.6 | 7.1 | 14.3 | 4.6 | 9.8 | 9.7 | 30.3 | 11.3 |

TABLE 6-continued

Examples for inventive compositions & firing schedules

| | Example Number | | | | | | | |
|---|---|---|---|---|---|---|---|---|
| | 16 | 17 | 18 | 19 | 20 | 21 | 22 | 23 |
| | | | | Composition | | | | |
| | F | K | L | M | I | N | O | O |
| % TPV 2-5 μm | 32.6 | 37.2 | 49.1 | 12.7 | 39.3 | 37.7 | 29.8 | 38.1 |
| % TPV 5-10 μm | 16.2 | 28.1 | 17.0 | 21.9 | 29.2 | 29.0 | 12.8 | 25.0 |
| % TPV 10-20 μm | 9.0 | 13.7 | 6.4 | 28.5 | 11.7 | 12.9 | 8.3 | 12.4 |
| % TPV 20-40 μm | 3.9 | 6.1 | 2.9 | 21.2 | 3.7 | 4.6 | 4.8 | 5.5 |
| % TPV > 40 μm | 2.0 | 2.2 | 3.3 | 5.7 | 1.2 | 1.3 | 2.0 | 1.9 |
| % TPV 0.5-5 μm | 65.1 | 46.4 | 67.3 | 19.8 | 51.4 | 49.7 | 69.1 | 52.1 |
| % TPV > 10 μm | 14.9 | 22.0 | 12.6 | 55.4 | 16.6 | 18.8 | 15.1 | 19.8 |
| Modulus of Rupture (psi) | — | — | — | 285 | 272 | 369 | 336 | 351 |
| Elastic Modulus at 25° C. (10$^6$ psi) | 0.87 | — | 1.79 | 0.55 | 0.65 | 0.66 | 0.84 | 0.69 |
| MOR/E at 25° C. | — | — | — | 0.052% | 0.042% | 0.056% | 0.040% | 0.051% |
| Transverse I-Ratio ($I_T$) | 0.90 | 0.88 | 0.87 | 0.85 | 0.88 | 0.85 | 0.89 | 0.87 |
| Axial I-Ratio ($I_A$) | 0.37 | 0.46 | 0.44 | 0.48 | 0.44 | 0.47 | 0.40 | 0.47 |
| % Alumina | 0 | 0 | 0 | 0 | 0 | 0 | 0 | 0 |
| % Mullite | 0.9 | 0.8 | 0.7 | 0 | 1.6 | 1.3 | 1.2 | 0.6 |
| % Spinel | 1.1 | 0 | 1.9 | 0 | 1.2 | 0 | 0.9 | 1.1 |

TABLE 7

Examples for comparative compositions & firing schedules

| | Example Number | | | | | |
|---|---|---|---|---|---|---|
| | C1 | C2 | C3 | C4 | C5 | C6 |
| | | | Composition | | | |
| | P | P | Q | R | S | T |
| MPS of Talc Sources (μm) | 5.5 | 5.5 | 5.5 | 14.4 | 10.0 | 5.5 |
| MPS of Alumina-Forming Sources (μm) | 0.6 | 0.6 | 0.6 | 0.6 | 0.6 | 0.3 |
| MPS of Kaolin Source (μm) | 0 | 0 | 11.0 | 0 | 4.0 | 4.0 |
| MPS of Calcined Kaolin Source (μm) | 0 | 0 | 0 | 0 | 0 | 3.0 |
| MPS of Kaolin + Calcined kaolin Sources (μm) | 0 | 0 | 11.0 | 0 | 4.0 | 3.2 |
| Wt % Dispersible Boehmite | 0 | 0 | 0 | 0 | 0 | 10.5 |
| T(max) (° C.) | 1410 | 1410 | 1410 | 1430 | 1405 | 1410 |
| Hold Time (hours) | 8 | 12 | 12 | 10 | 10 | 1.7 |
| 750-840 rate (° C./hour) | — | — | — | 111 | 111 | 100 |
| 840-900 rate (° C./hour) | — | — | — | 111 | 111 | 50 |
| 1050-1150 rate (° C./hour) | — | — | — | 40 | 40 | 125 |
| 1150-1200 rate (° C./hour) | 50 | 200 | 200 | 40 | 40 | 250 |
| 1200-1275 rate (° C./hour) | 50 | 200 | 200 | 28 | 28 | 250 |
| 1275-1380 rate (° C./hour) | 50 | 200 | 200 | 28 | 28 | 200 |
| 1380-1400 rate (° C./hour) | 50 | 200 | 200 | 28 | 28 | 200 |
| Axial CTE, 25-800° C. (10$^{-7}$/° C.) | 2.8 | 1.9 | 3.2 | 2.7 | 3.5 | 1.7 |
| % Porosity | 35.3 | 31.2 | 30.0 | 28.2 | 34.1 | 27.1 |
| $d_{50}$ (μm) | 1.5 | 2.5 | 3.2 | 4.1 | 2.2 | 2.0 |
| % TPV 0.5-5 μm | 88.6 | 90.0 | 88.5 | — | — | 82.9 |
| % TPV > 10 μm | 7.1 | 6.5 | 6.2 | — | — | 16.5 |
| Transverse I-Ratio ($I_T$) | — | — | — | 0.88 | 0.91 | — |
| Axial I-Ratio ($I_A$) | — | — | — | 0.39 | 0.39 | — |
| % Alumina | 0 | 0 | 0 | — | — | — |
| % Mullite | 0 | 0.9 | 1.7 | — | — | — |
| % Spinel | 1.1 | 1.5 | 1.5 | — | — | — |

TABLE 8

Examples for comparative compositions & firing schedules

| | Example Number | | | | | |
|---|---|---|---|---|---|---|
| | C7 | C8 | C9 | C10 | C11 | C12 |
| | | | Composition | | | |
| | U | P | V | W | X | Y |
| MPS of Talc Sources (μm) | 10.0 | 5.5 | 5.5 | 5.5 | 5.5 | 5.5 |
| MPS of Alumina-Forming Sources (μm) | 0.6 | 0.6 | 0.5 | 0.2 | 0.2 | 0.2 |

TABLE 8-continued

Examples for comparative compositions & firing schedules

| | Example Number | | | | | |
|---|---|---|---|---|---|---|
| | C7 | C8 | C9 | C10 | C11 | C12 |
| | | | Composition | | | |
| | U | P | V | W | X | Y |
| MPS of Kaolin Source (μm) | 0 | 0 | 0 | 4.0 | 4.0 | 0 |
| MPS of Calcined Kaolin Source (μm) | 0 | 0 | 0 | 3.0 | 3.0 | 0 |
| MPS of Kaolin + Calcined kaolin Sources (μm) | 0 | 0 | 0 | 3.3 | 3.2 | 0 |
| Wt % Dispersible Boehmite | 0 | 0 | 6.0 | 13.7 | 13.9 | 37.9 |
| T(max) (° C.) | 1405 | 1430 | 1430 | 1410 | 1410 | 1405 |
| Hold Time (hours) | 10 | 10 | 10 | 1.7 | 1.7 | 10 |
| 750-840 rate (° C./hour) | 111 | 111 | 111 | 100 | 100 | 111 |
| 840-900 rate (° C./hour) | 111 | 111 | 111 | 50 | 50 | 111 |
| 1050-1150 rate (° C./hour) | 40 | 40 | 40 | 125 | 125 | 40 |
| 1150-1200 rate (° C./hour) | 40 | 40 | 40 | 250 | 250 | 40 |
| 1200-1275 rate (° C./hour) | 28 | 28 | 28 | 250 | 250 | 28 |
| 1275-1380 rate (° C./hour) | 28 | 28 | 28 | 200 | 200 | 28 |
| 1380-1400 rate (° C./hour) | 28 | 28 | 28 | 200 | 200 | 28 |
| Axial CTE, 25-800° C. ($10^{-7}$/° C.) | 1.5 | 1.1 | 0.0 | 0.4 | 1.1 | -0.2 |
| % Porosity | 33.0 | 33.7 | 33.6 | 20.7 | 25.2 | 21.0 |
| $d_{50}$ (μm) | 2.2 | 2.7 | 2.4 | 1.6 | 1.7 | 2.7 |
| % TPV 0.5-5 μm | — | — | — | 91.2 | 77.1 | — |
| % TPV > 10 μm | — | — | — | 6.6 | 21.4 | — |
| Transverse I-Ratio ($I_T$) | 0.96 | 0.96 | 0.93 | — | — | 0.93 |
| Axial I-Ratio ($I_A$) | 0.34 | — | — | — | — | — |
| % Alumina | — | — | — | — | — | — |
| % Mullite | — | — | — | — | — | — |
| % Spinel | — | — | — | — | — | — |

What is claimed is:

1. A ceramic honeycomb article, comprising:
a ceramic with a phase of cordierite which exhibits
a coefficient of thermal expansion in an axial direction $<1.5\times10^{-7}$/° C. across the temperature range from 25° C. to 800° C.;
a total porosity, P, of ≧28%;
a transverse I ratio, $I_T$, of <0.87; and
a pore size distribution wherein ≧60% of a total pore volume of the ceramic has a pore diameter of between 0.5 μm to 5 μm.

2. The ceramic honeycomb article of claim 1 wherein the ceramic consists essentially of:
from about 49 to about 53 percent by weight $SiO_2$,
from about 33 to about 38 percent by weight $Al_2O_3$, and
from about 12 to about 16 percent by weight MgO.

3. The ceramic honeycomb article of claim 1, further comprising a mean pore diameter, $d_{50}$, in the range from 2.0 μm to 4.0 μm.

4. The ceramic honeycomb article of claim 1 wherein the coefficient of thermal expansion is ≦$1.0\times10^{-7}$/° C. across the temperature range from 25° C. to 800° C.

5. The ceramic honeycomb article of claim 4 wherein the coefficient of thermal expansion is ≦$0.8\times10^{-7}$/° C. across the temperature range from 25° C. to 800° C.

6. The ceramic honeycomb article of claim 5 wherein the coefficient of thermal expansion is ≦$0.5\times10^{-7}$/° C. across the temperature range from 25° C. to 800° C.

7. The ceramic honeycomb article of claim 1 wherein P≦40%.

8. The ceramic honeycomb article of claim 1 wherein P≧30%.

9. The ceramic honeycomb article of claim 8 wherein 30%≦P≦36%.

10. The ceramic honeycomb article of claim 1 wherein P≦33%.

11. The ceramic honeycomb article of claim 1, further comprising a modulus of rupture strength, MOR, wherein MOR>300 psi for a 600/4 cell geometry.

12. The ceramic article of claim 11, further comprising a modulus of rupture strength, MOR, wherein MOR>350 psi for a 600/4 cell geometry.

13. The ceramic article of claim 12, further comprising a modulus of rupture strength, MOR, wherein MOR>400 psi for a 600/4 cell geometry.

14. The ceramic article of claim 1, further comprising $d_{90}$<15 μm.

15. The ceramic article of claim 1, further comprising:
CTE≦$1.0\times10^{-7}$/° C.; and
P≧30%.

16. A ceramic honeycomb article, comprising:
a ceramic with a phase of cordierite which exhibits
a transverse I ratio, $I_T$, of ≦0.87;
a coefficient of thermal expansion in an axial direction $<1.0\times10^{-7}$/° C.
across the temperature range from 25° C. to 800° C.; and
a total porosity, P, of 28%≦P≦33%.

17. The ceramic honeycomb article of claim 16, wherein the ceramic consists essentially of:
from about 49 to about 53 percent by weight $SiO_2$,
from about 33 to about 38 percent by weight $Al_2O_3$, and
from about 12 to about 16 percent by weight MgO.

18. The ceramic honeycomb article of claim 16, further comprising a mean pore diameter, $d_{50}$, in the range from 2.0 μm to 6.0 μm.

19. The ceramic honeycomb article of claim 16, wherein the coefficient of thermal expansion is ≦$0.9\times10^{-7}$/° C. across the temperature range from 25° C. to 800° C.

20. The ceramic honeycomb article of claim 16, wherein the coefficient of thermal expansion is ≦$0.3\times10^{-7}$/° C. across the temperature range from 25° C. to 800° C.

21. The ceramic honeycomb article of claim 16, wherein the coefficient of thermal expansion is $\leq -0.4 \times 10^{-7}/°$ C. across the temperature range from 25° C. to 800° C.

22. The ceramic honeycomb article of claim 16, wherein $P \geq 30\%$.

23. The ceramic honeycomb article of claim 16, exhibiting a modulus of rupture strength, MOR, wherein MOR>300 psi for a 600/4 cell geometry.

24. The ceramic article of claim 16, further comprising:
$CTE \leq 0.5 \times 10^7/°$ C.; and
$P \geq 30\%$.

25. A method of manufacturing a ceramic honeycomb article having a sintered phase cordierite composition, comprising the steps of:
providing a plasticized cordierite precursor batch composition having
an inorganic powder batch composition containing
at least one talc source having a mean particle size of at least 8 µm and a morphology index of not more than 0.70;
one or more alumina-forming sources, wherein the alumina-forming sources have a weighted average median particle size that does not exceed 5 µm; and
at least 20 weight percent of an alumino-silicate source comprising at least one raw kaolin and, optionally, at least one calcined kaolin, wherein the weighted average median particle size of the kaolin+calcined kaolin mixture does not exceed 6 µm; and
a binder system;
forming an extruded green body from the plasticized cordierite precursor batch composition; and
firing the green body under conditions effective to convert the green body into a ceramic article comprising a sintered phase cordierite composition, wherein the sintered phase cordierite composition exhibits
a coefficient of thermal expansion, CTE, in an axial direction $<1.5 \times 10^{-7}/°$ C. across a temperature range from 25° C. to 800° C.; and
a total porosity, P, of $\geq 28\%$.

26. The method of claim 25, wherein the conditions effective further comprise:
i) firing the green body at a temperature of at least 1390° C. when the weighted average median particle size of the alumina-forming sources is less than 1 µm;
ii) firing the green body at a temperature of at least 1400° C.; when the weighted average median particle size of the alumina-forming source is in the range of from 1 µm to 3 µm; and
iii) firing the green body at a temperature of at least 1405° C. when the weighted average median particle size of the alumina-forming source is greater than 3 µm.

27. The method of claim 25, further comprising at least one dispersible alumina-forming source having a dispersed median particle size of not more than 0.5 µm.

28. The method of claim 27, wherein the dispersible alumina-forming source is present in an amount of from 1 wt % to 5 wt % of the inorganic powder batch composition.

29. The method of claim 27, wherein the dispersible alumina-forming source has a specific surface area of at least 50 $m^2/g$.

30. The method of claim 25, wherein the talc source has a morphology index of at least 0.40 and not more than 0.70.

31. The method of claim 25, wherein the talc source has a morphology index of at least 0.50 and not more than 0.70.

32. The method of claim 25, wherein the sintered phase cordierite composition has a mean pore diameter in the range of from 2.0 µm to 6.0 µm.

33. The method of claim 25, wherein the sintered phase cordierite composition comprises:
$28\% \leq P \leq 40\%$, and
$CTE < 1.5 \times 10^{-7}/°$ C.

34. The method of claim 25, wherein the sintered phase cordierite composition comprises:
$28\% \leq P \leq 33\%$, and
$CTE < 1.0 \times 10^{-7}/°$ C.

35. The method of claim 25, wherein the plasticized cordierite precursor batch composition does not comprise a non-crystalline silica.

36. The ceramic honeycomb article of claim 1 wherein the ceramic exhibits an axial I ratio, $I_A$, of >0.41.

37. The ceramic honeycomb article of claim 1 wherein the ceramic exhibits an axial I ratio, $I_A$, of >0.42.

38. The ceramic honeycomb article of claim 1 wherein the ceramic exhibits an axial I ratio, $I_A$, of >0.46.

39. The ceramic honeycomb article of claim 1, further comprising a mean pore diameter, $d_{50}$, greater than 2.0 µm.

40. The ceramic honeycomb article of claim 1 wherein $P \geq 30.5\%$.

41. The ceramic honeycomb article of claim 16, further comprising a mean pore diameter, $d_{50}$, greater than 2.0 µm.

* * * * *